US008326230B2

(12) United States Patent
Schirrmacher et al.

(10) Patent No.: US 8,326,230 B2
(45) Date of Patent: Dec. 4, 2012

(54) TEST DEVICE AND METHOD FOR CARRYING OUT A FUNCTIONAL TEST OF A COMMUNICATION SYSTEM

(75) Inventors: Martin Schirrmacher, Buxtehude (DE); Uwe Schwark, Ottersberg (DE); Uwe Donnig, Cuxhaven (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/045,196

(22) Filed: Mar. 10, 2011

(65) Prior Publication Data
US 2011/0256835 A1    Oct. 20, 2011

Related U.S. Application Data

(63) Continuation of application No. PCT/EP2009/062042, filed on Sep. 17, 2009.

(60) Provisional application No. 61/098,054, filed on Sep. 18, 2008.

(30) Foreign Application Priority Data

Sep. 18, 2008  (DE) .......................... 10 2008 042 208

(51) Int. Cl.
*H04B 17/00* (2006.01)

(52) U.S. Cl. ...................................................... 455/67.11
(58) Field of Classification Search ................ 455/67.11
See application file for complete search history.

(56) References Cited

U.S. PATENT DOCUMENTS

| 4,970,455 | A  | * | 11/1990 | Suzuki et al. ........... 324/95 |
| 6,553,098 | B1 | * | 4/2003  | Harrison et al. ........ 379/22.03 |
| 7,606,592 | B2 | * | 10/2009 | Becker ..................... 455/523 |
| 2007/0013607 | A1 | * | 1/2007 | Town ........................ 343/906 |
| 2009/0167321 | A1 | * | 7/2009 | Krueger et al. .......... 324/612 |
| 2010/0070222 | A1 | * | 3/2010 | Schirrmacher et al. .... 702/66 |

FOREIGN PATENT DOCUMENTS

| DE | 10 2005 032141 A1 | 1/2007 |
| DE | 10 2006 036082 A1 | 2/2008 |

OTHER PUBLICATIONS

German Office Action for International Application No. DE 10 2008 042 208.8-35 dated May 8, 2009.
International Search Report for PCT Application No. PCT/EP2009/062042 dated Nov. 26, 2009.

* cited by examiner

*Primary Examiner* — Matthew Anderson
*Assistant Examiner* — David Bilodeau
(74) *Attorney, Agent, or Firm* — Jenkins, Wilson, Taylor & Hunt, P.A.

(57) ABSTRACT

A testing device comprises a transmission path comprising at least one leakage conduction antenna disposed in the cabin of the aircraft, a control device coupled to the transmission path, said control device comprising a generating device for generating a broad-band interference signal and a transfer device for feeding an HF signal to the leakage conduction antenna, wherein the fed HF signal has a pre-defined power level and contains at least the generated broad-band interference signal, at least one measuring device coupled to the transmission path at a pre-defined coupling point, said measuring device measuring the power level of the HF signal at the coupling point and preparing a measurement signal that is proportional to the measured power level, and an evaluation means for preparing a test result by way of a comparison between the prepared measurement signal and a target signal that depends on the power level of the fed HF signal.

16 Claims, 8 Drawing Sheets

TEST DEVICE AND METHOD FOR CARRYING OUT A FUNCTIONAL TEST OF A COMMUNICATION SYSTEM

CROSS-REFERENCE TO RELATED APPLICATIONS

This application is a continuation of PCT/EP2009/062042 filed Sep. 17, 2009 and claims the benefit of U.S. Provisional application No. 61/098,054 filed Sep. 18, 2008 and German Patent Application No. 10 2008 042 208.8 filed Sep. 18, 2008, the entire disclosures of which are herein incorporated by reference.

FIELD OF THE INVENTION

The present invention relates to a test device and a method for carrying out a functional test of a communication system, in particular in an aircraft cabin of an aircraft, in particular in the field of aviation and aerospace.

Although it can be applied to any field, the present invention will be described in greater detail with reference to an aircraft or a passenger aircraft.

Communication systems in aircraft cabins provide communication services or services, such as GSM, UMTS, WLAN or the like, for the aircraft crew or passengers.

In order to emit the respective service signal for the corresponding service, a leaky line antenna can be used which is arranged longitudinally in the aircraft cabin. In order to check the correct installation and operation of the communication system, in particular to ensure the distribution of the high-frequency (HF) signal within the aircraft cabin, a coverage measurement (radio supply measurement) is taken in each frequency band of the corresponding services using a HF spectrum analyser and a measuring antenna at a plurality of different locations in the aircraft cabin. The measurement results can vary widely depending on the condition and configuration of the aircraft cabin and on the selection of the measurement location. For this reason the measurement results have to be suitably averaged and corrected by the respective antenna factors of the measuring antennae used.

In some instances, if a measurement is taken inaccurately or incorrectly, it may appear that a predetermined, in particular legal threshold has not been met, even though this legal threshold has in actual fact been exceeded. Furthermore, it is possible that an error message will be generated, although in actual fact there is no error.

With conventional measurement using a HF spectrum analyser and specially provided measuring antennae, the respective measurements disadvantageously have to be carried out manually and therefore require a great deal of time and money. Specially trained personnel are also disadvantageously required to take and evaluate the conventional measurements. In particular, these trained personnel must have experience of HF measurements. Furthermore, the conventional measurements require special hardware, for example the HF spectrum analyser and the measuring antennae.

In order to carry out the test at any desired location in the aircraft cabin, HF test signals are normally used which have a power level requiring legal approval. This legal approval is normally necessary since the conventional HF test signals, with the power levels used, can also still be measured outside the aircraft and may lead to potential interferences to other services.

SUMMARY OF THE INVENTION

A goal of the present invention is therefore to provide an automated functional test of a communication system, in particular in an aircraft cabin of an aircraft.

A further aim is to provide an automated functional test of a communication system which requires no legal approval.

A test device for carrying out a functional test of a communication system, in particular in an aircraft cabin of an aircraft, is accordingly proposed and comprises:
  a transmission path which comprises at least one leaky line antenna arranged in the aircraft cabin;
  a control device which is coupled to the transmission path and comprises a generating unit for generating a broadband noise signal and a transmission unit for feeding a HF signal to the leaky line antenna, the fed HF signal having a predetermined power level and containing at least the generated broadband noise signal;
  at least one measuring unit which is coupled at a predetermined coupling point to the transmission path for measurement of the power level of the HF signal at the coupling point and for provision of a measuring signal which is proportional to the measured power level; and
  an evaluation means for providing a test result by comparing the measuring signal provided and a setpoint signal which is dependent on the power level of the fed HF signal.

A method for carrying out a functional test of a communication system, in particular in an aircraft cabin of an aircraft, is further proposed and comprises the following steps:
  generation of broadband noise signal;
  feeding of a HF signal into a transmission path which comprises at least one leaky line antenna arranged in the aircraft cabin, the fed HF signal having a predetermined or set power level and containing at least the generated broadband noise signal;
  measurement of the power level at a predeterminable coupling point of the transmission path;
  provision of a measuring signal which is proportional to the measured power level; and
  provision of a test result by comparing the measuring signal provided and a setpoint signal which is dependent on the power level of the fed HF signal.

An advantage of the present invention lies in that the functional test in accordance with the invention of the communication system can be carried out without additional special HF measuring units, such as a HF spectrum analyser, and without the use of specially trained personnel, since all the necessary components of the test device can be integrated into the communication system.

As a result of the test device according to the invention, the functional test of the communication system can also be actuated merely by a single push of a button which triggers the test device, and can be carried out in a fully automated manner. At the end of the functional test a signal can be provided to the user as a function of the test result. For example, the test result may include an error message or an error code.

A further advantage of the present invention lies in that it is possible to dispense with the conventional manual measurement in the aircraft cabin, and also with the conventional subsequent processing of the test data.

In particular, as a result of the measurement transmitted via the leaky line antenna and the measuring unit at the predetermined coupling point, for example at the end of the transmission path, the test results according to the invention are less tainted by fluctuations than the conventional test results and therefore can be better reproduced and are consequently more reliable. As a result of the test device according to the invention and the method according to the invention for carrying out the functional test, errors during installation such as forgotten links or connections, line breaks or damage to the leaky line antenna can be clearly and quickly identified.

The measurement transmitted through the leaky line antenna further makes it possible, in combination with the use of the measuring unit at least at one predetermined coupling point of the transmission path, to reduce the power level of the HF signal required for the functional test to a power level which renders redundant the request for frequency allocations for the test frequencies used, and therefore legal approval. The functional test according to the invention can thus be carried out at any desired location in the world and requires no legal approval from the relevant national authorities.

The test device according to the invention is further set up to monitor and optionally adjust the function and efficiency of the communication system, in particular with a relatively high test coverage and during operation of the communication system. For example, the power level of the signals to be transmitted via the leaky line antenna can be adjusted.

Advantageous embodiments and improvements of the invention are described in the dependent claims.

In accordance with a preferred configuration of the invention the noise signal provided is broadband compared with a coherence bandwidth of the transmission path.

Within the meaning of the present application the coherence bandwidth Wc is defined by the frequency-time autocorrelation function $\phi FT$ ($\Delta t$, $\Delta t=0$) of the channel transmission function:

$$|\phi FT(\Delta f = Wc, \Delta t = 0)| = \tfrac{1}{2} |\phi FT(\Delta f = 0, \Delta t = 0)|$$

The coherence bandwidth Wc is the value at which the value of the frequency-time autocorrelation function with increasing $\Delta f$ first falls to half. This is therefore a measure for the frequency difference $\Delta f$ by which two sine signals must differ in order to exhibit completely different channel transmission properties during transmission. If the signal bandwidth W is smaller than the coherence bandwidth Wc, all spectral signal portions will exhibit substantially identical transmission properties. The coherence bandwidth Wc consequently approximately denotes the maximum frequency interval over which two frequency components of a signal experience a comparable or correlated amplitude loss.

If the time spread of the signal (multipath spread or time delay spread) caused by the multipath spreading over the radio channel is D seconds, then the following is approximately true for the coherence bandwidth Wc in Hz:

$$Wc = 1/(2*Pi*D)$$

Furthermore, the control device is configured in particular as a computer program product which is preferably part of the network control unit (NCU) of the aircraft cabin.

The computer program product is preferably set up, on a programme-controlled unit such as the network control unit, to carry out steps to develop the function of the control device.

A computer program product such as a computer program means may, for example, be provided or supplied as a storage medium such as a memory card, USB stick, floppy disc, CD-ROM, DVD or else in the form of a downloadable file from a server in a network. For example, this may occur in a wireless communication network by transmission of a corresponding file containing the computer program product or the computer program means.

In accordance with a further preferred configuration the broadband noise signal provided contains at least one masking signal. The respective masking signal is adapted, in particular, to mask a respective terrestrial base station signal which uses a respective predetermined frequency band.

In accordance with a preferred development of the invention the measuring unit has a HF termination.

In accordance with a further preferred development the measuring unit has a terminating resistor for HF termination. Alternatively, the measuring unit is coupled to a terminating resistor for HF termination.

In particular, the transmission path has a first end and a second end. The leaky line antenna is preferably coupled between the first end and the second end. The control device is further preferably coupled to the first end. Furthermore, the evaluation means is preferably coupled to the first end or to the second end.

In accordance with a further preferred configuration the generating unit comprises a number of noise generators. The respective noise generator is preferably adapted to provide a respective noise signal which is limited to a predetermined frequency band.

In accordance with a further preferred configuration the control means comprises a selection means. The selection means is preferably adapted to select at least one of the number of noise generators for providing a band-limited noise signal for the HF signal.

The respective frequency band of the band-limited noise signal is preferably set to a corresponding pre-determined frequency band of a respective terrestrial base station.

In accordance with a further preferred development the control device has a trigger means. The trigger means is preferably set up to trigger implementation of the functional test with the selected band-limited noise signal.

In particular, the trigger means is further set up to carry out a plurality of functional tests in series with different, selected band-limited noise signals.

The evaluation means is preferably set up to provide a test result vector as a function of the plurality of functional tests of the communication system carried out in series.

For example, the leaky line antenna is configured as a coaxial line with a plurality of perforations. The plurality of perforations may also comprise slots and/or holes.

For example, the measuring signal is configured as a direct voltage signal, as a current signal or as a frequency signal.

In accordance with a further preferred development the measuring device has a HF detector. The HF detector is preferably adapted to convert the power level of the HF signal at the coupling point into a proportional direct voltage signal, into a current signal or a frequency signal.

In accordance with a further preferred configuration the transmission path comprises a transmitting leaky line antenna which is arranged longitudinally in the aircraft cabin, and a receiving leaky line antenna which is arranged longitudinally in the aircraft cabin.

For example, the transmitting leaky line antenna and the receiving leaky line antenna are arranged in parallel in the aircraft cabin and are each coupled between the first end and the second end of the transmission path.

In accordance with a further preferred development a plurality of measuring units are provided, wherein a first measuring unit is coupled to the transmitting leaky line antenna at the second end of the transmission path, and a second measuring unit is coupled to the receiving leaky line antenna at the first end of the transmission path.

In accordance with a further preferred development at least one transmitting/receiving unit is provided. The respective transmitting/receiving unit is preferably adapted to provide a service signal for provision of a predetermined service and for transmission over the transmission path.

The transmitting/receiving unit preferably integrates the second measuring unit.

In accordance with a further preferred development a combination unit is provided which is set up to combine the broadband noise signal provided and the at least one service signal in order to form the HF signal to be fed over the transmission path.

In accordance with a further preferred development a combination unit is provided which is set up to combine the band-limited noise signals provided by the noise generators and the at least one service signal to the HF signal to be fed over the transmission path.

In accordance with a further preferred development an error detection means is provided which is adapted to detect an error of one or more noise generators and/or an error over the transmission path as a function of the test result vector provided.

The control device or the measuring unit preferably contains the evaluation means and/or the error detection means.

In accordance with a further preferred configuration the test device is set up to test the communication system during operation of the communication system.

BRIEF DESCRIPTION OF THE DRAWINGS

The invention will be described hereinafter in greater detail by means of embodiments given with reference to the accompanying drawings, in which.

DESCRIPTION OF EXEMPLARY EMBODIMENTS

Figure 1:
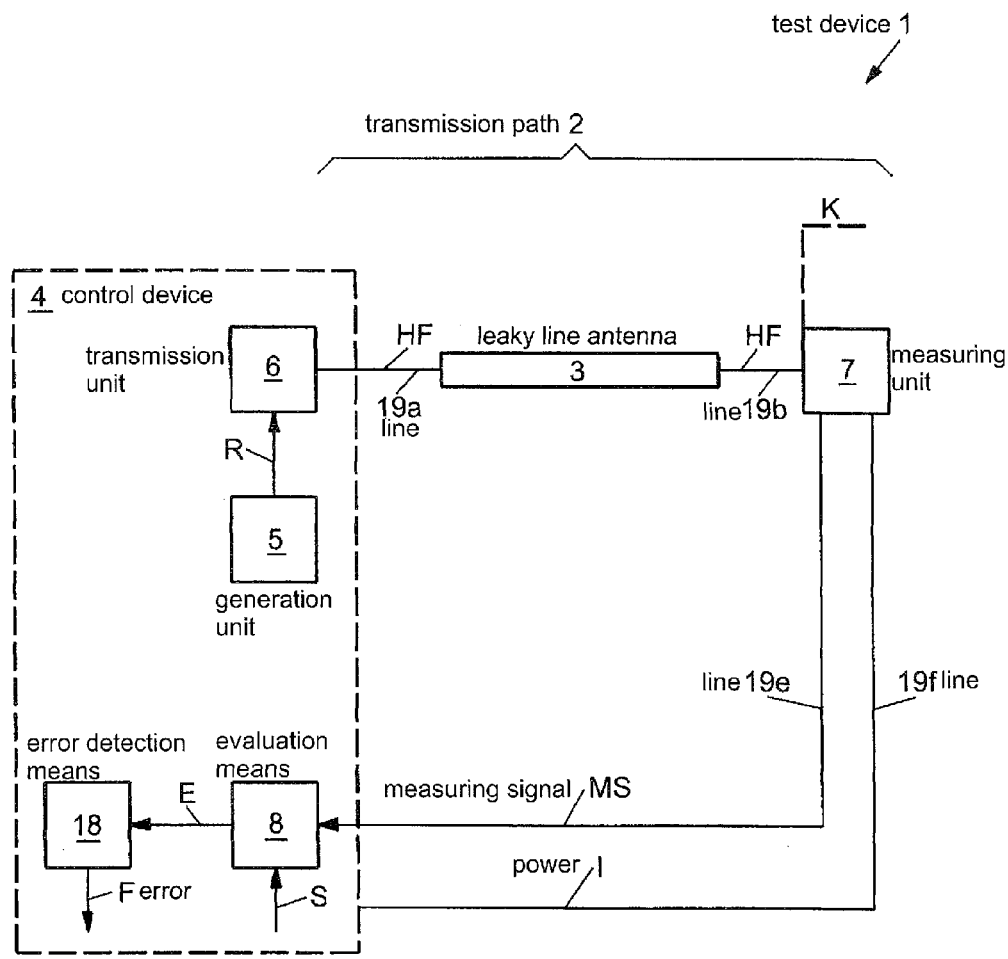
FIG. 1 is a schematic block diagram of a first embodiment of the test device according to the invention.

In the figures, like reference numerals denote like or functionally like components, unless stated otherwise.

FIG. 1 shows a schematic block diagram of a first embodiment of a test device 1 for carrying out a functional test of a communication system in an aircraft cabin of an aircraft.

The test device 1 comprises a transmission path 2, a control device 4 which is coupled to the transmission path 2, at least one measuring unit 7 which is coupled at a predetermined coupling point K to the transmission path 2, and an evaluation means 8.

The transmission path 2 comprises at least one leaky line antenna 3 which is arranged in the aircraft cabin. For example, the leaky line antenna 3 is configured as a coaxial line with a plurality of perforations.

Figure 6:
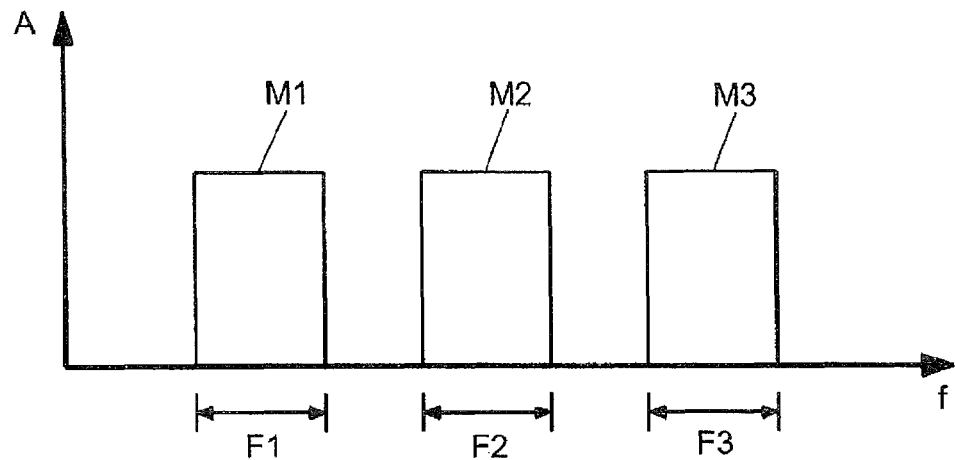
FIG. 6 is a schematic amplitude-frequency diagram of an embodiment with three masking signals generated in accordance with FIG. 5.

For example, the control device 4 is coupled to the leaky line antenna 3 by a line 19a. The control device 4 has a generating unit 5 for generating a broadband noise signal R, and a transmission unit 6 for feeding a HF signal HF to the leaky line antenna 3. The fed HF signal HF has a set or predetermined power level and contains at least the generated broadband noise signal R. The noise signal R provided by the generating unit 5 is broadband compared to a coherence bandwidth of the transmission path 2. The broadband noise signal R provided preferably further contains at least one masking signal M1-M3. The respective masking signal M1-M3 is adapted to mask a respective terrestrial base station signal B1-B3 which uses a respective predetermined frequency band F1-F3 (cf. FIG. 6).

The measuring unit 7 is adapted to measure the power level of the HF signal HF at the predetermined coupling point K in order to provide a measuring signal MS which is proportional to the power level measured. For example, the measuring unit 7 is coupled to the leaky line antenna 3 by a line 19b. Furthermore, the measuring unit 7 is supplied with power I by the control device 4 via a line 19e. The measuring unit 7 further transmits the measuring signal MS to the evaluation means 8 via a line 19f.

The measuring unit 7 has a HF termination. For example, the measuring unit 7 comprises a terminating resistor 9 in order to form the HF termination. Alternatively, the measuring unit 7 can be coupled to a terminating resistor 9. For example, the measuring signal MS is configured as a direct voltage signal, as a current signal or as a frequency signal. For example, the measuring unit 7 may be configured as a HF detector which is set up to convert the power level of the HF signal HF at the coupling point K into a proportional direct voltage signal.

The evaluation means 8 is set up to provide a test result E by comparing the measuring signal MS provided and a setpoint signal SS which is dependent on the power level of the fed HF signal HF.

The control device 4 further preferably comprises an error detection means 18. The error detection means 18 is setup to detect an error F over the transmission path 2 as a function of the test result E provided by the evaluation means 8.

Figure 2:
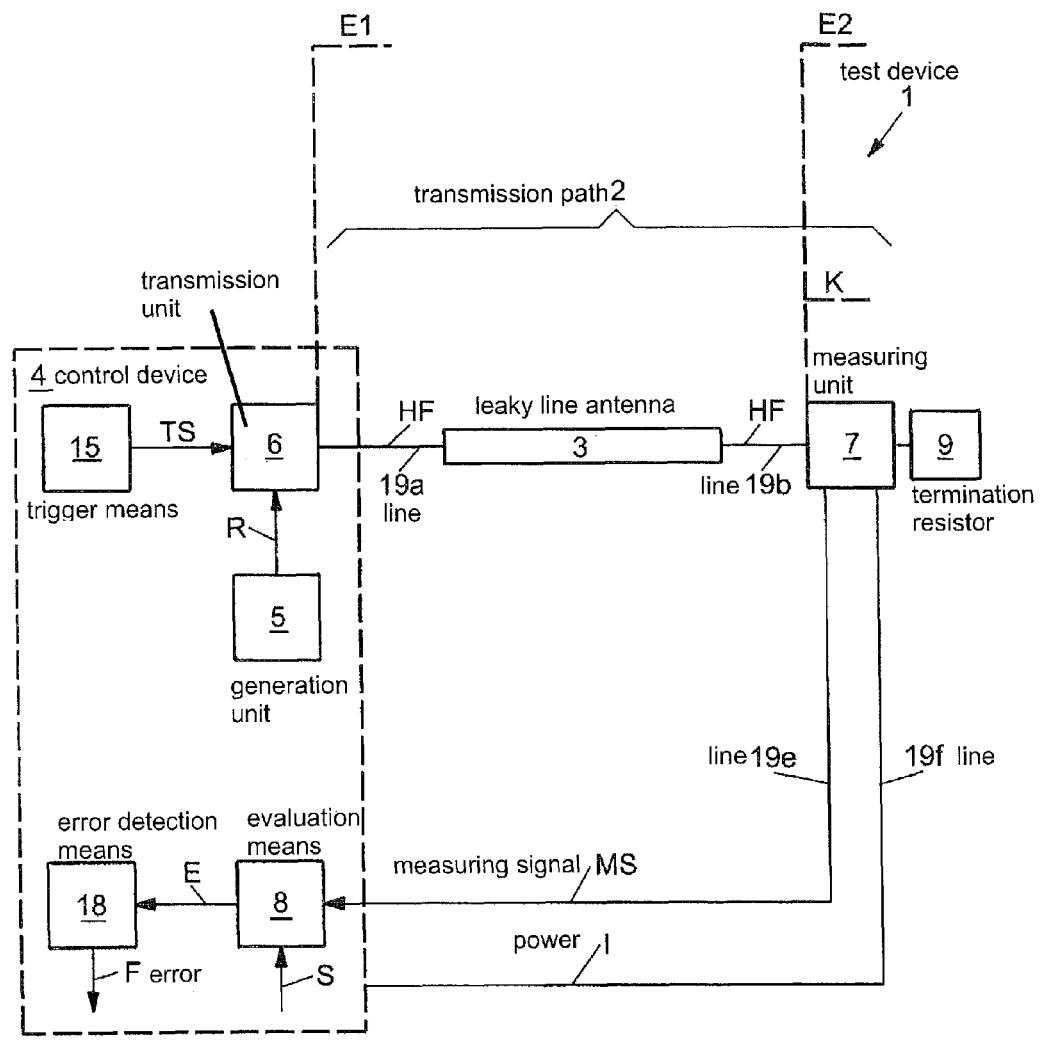
FIG. 2 is a schematic block diagram of a second embodiment of the test device according to the invention.
Figure 8:
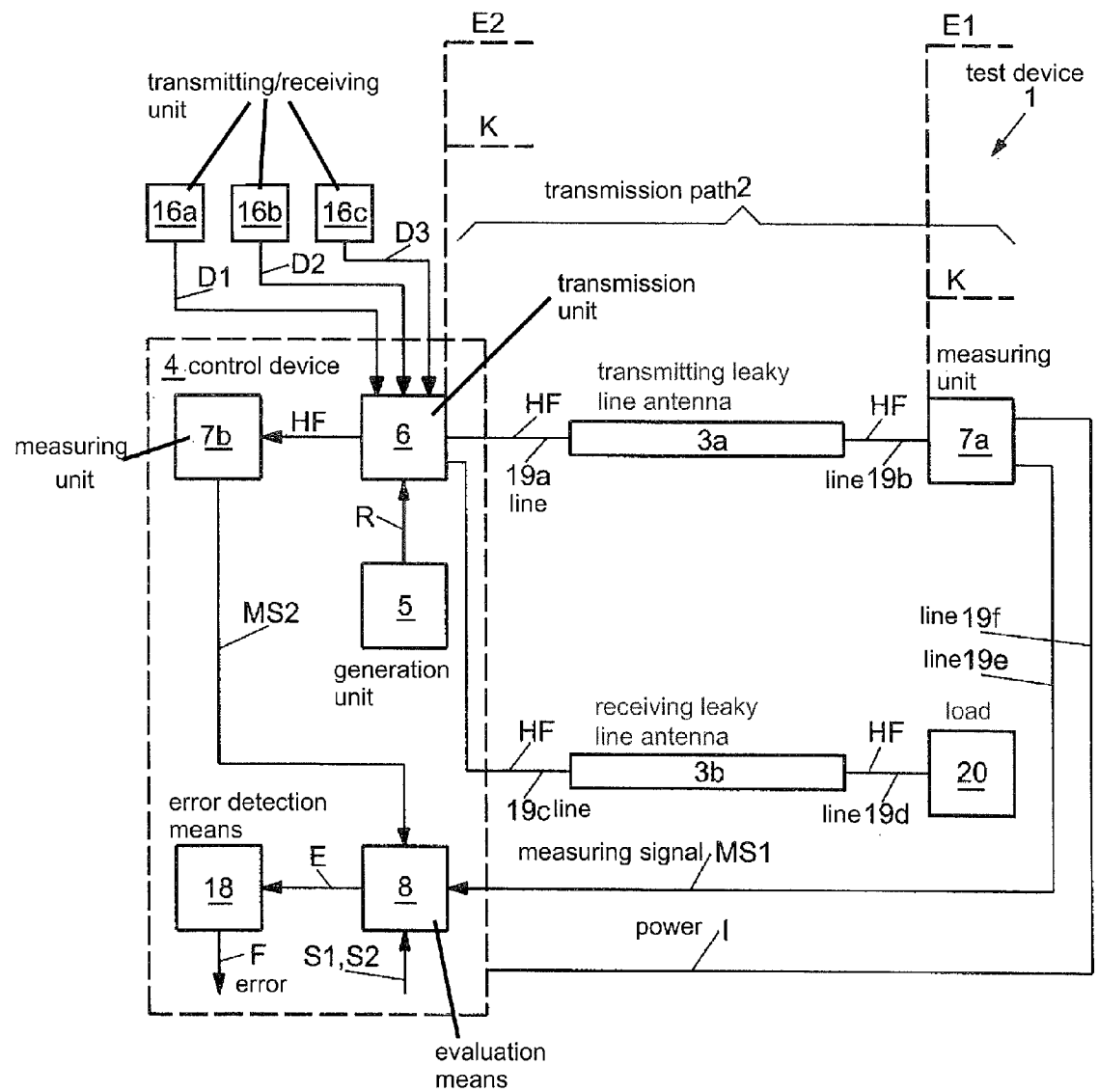
FIG. 8 is a schematic block diagram of a third embodiment of the test device according to the invention.

The further embodiments of the test device 1 according to FIGS. 2 and 8 contain all the features of the first embodiment of the test device 1 according to FIG. 1. With regard to those features in FIGS. 2 and 8 which are also shown in FIG. 1, reference is hereby made to FIG. 1 in order to avoid repetitions.

FIG. 2 shows a second embodiment of the test device 1 according to the invention. The second embodiment of the test device 1 according to FIG. 2 differs in part from the first embodiment according to FIG. 1 in that the measuring unit 7 is coupled to a terminating resistor 9 for HF termination and, in contrast to FIG. 1, integrates a terminating resistor 9 of this type.

With further reference to FIG. 2, the transmission path 2 has a first end E1 and a second end E2. The leaky line antenna 3 is preferably coupled between the first end E1 and the second end E2. The control device 4 is coupled to the first end E2 and the evaluation means 8 is coupled to the second end E2.

Furthermore, the control device 4 comprises a trigger means 15 which is set up to trigger implementation of the functional test by a trigger signal TS.

Figure 3:
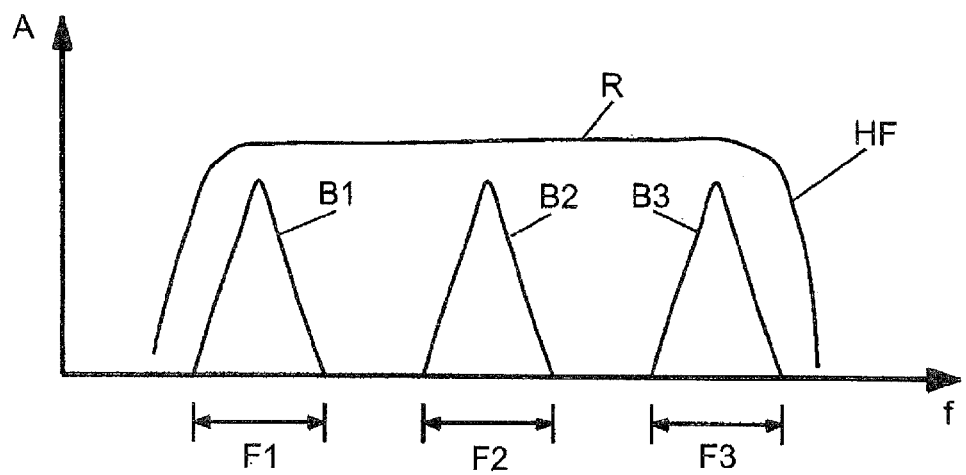
FIG. 3 is a schematic amplitude-frequency diagram with a first embodiment of a HF signal according to the invention and three terrestrial base station signals.
Figure 4:
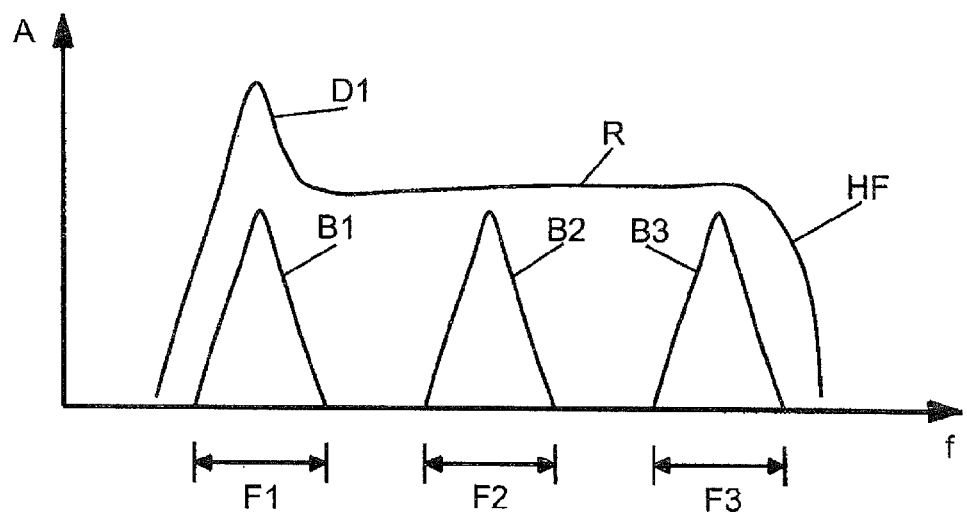
FIG. 4 is a schematic amplitude-frequency diagram with a second embodiment of the HF signal according to the invention and three terrestrial base station signals.

FIG. 3 shows a schematic amplitude-frequency diagram with a first embodiment of the HF signal HF according to the invention and 3 terrestrial base station signals B1-B3. Similarly, FIG. 4 shows a schematic amplitude-frequency diagram with a second embodiment of the HF signal HF according to the invention and the three terrestrial base station signals B1-B3. In accordance with FIG. 3, the HF signal HF corresponds to the noise signal R provided. By contrast, the HF signal according to FIG. 4 comprises the noise signal R and a service signal D1 imposed thereon.

Figure 5:
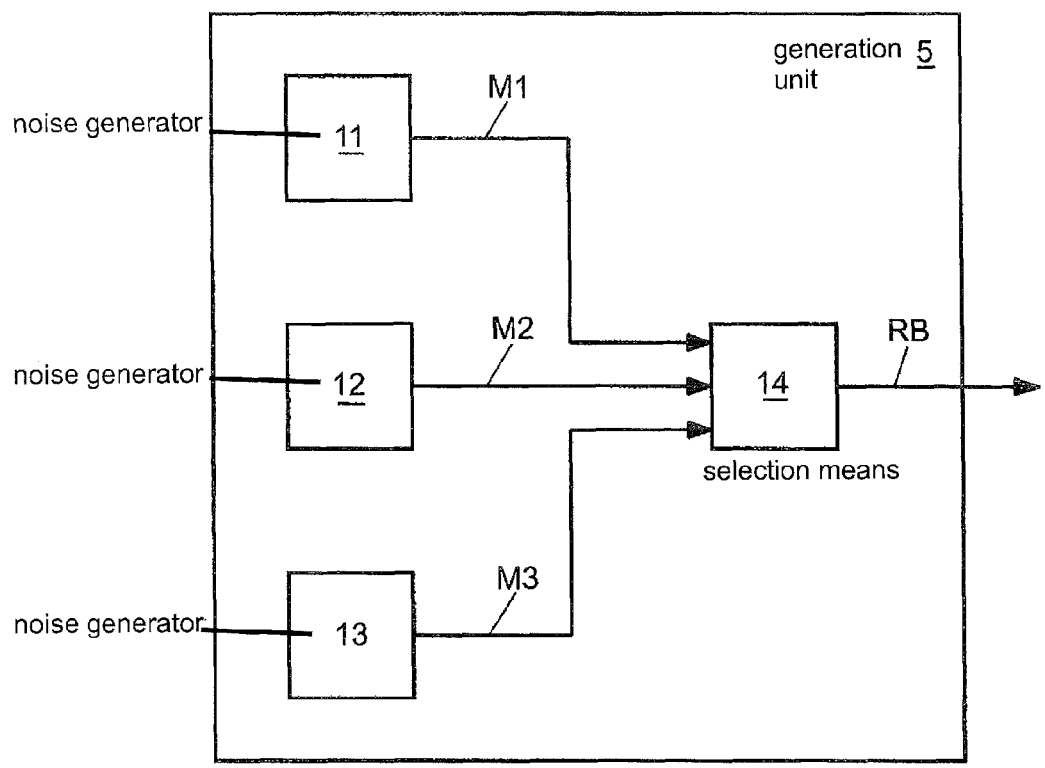
FIG. 5 is a schematic block diagram of an embodiment of the generating device according to FIG. 1.

In order to provide a band-limited and noise signal RB as a noise signal R, the generating unit 5 may comprise a number of noise generators 11-13. An embodiment of a generating unit 5 of this type with a number of noise generators 11-13 is shown in FIG. 5. With no general limitation, the generating unit 5 according to FIG. 5 has three noise generators 11-13. The respective noise generator 11-13 is adapted to provide a respective noise signal M1-M3 which is limited to a predetermined frequency band F1-F3 (see FIG. 6).

FIG. 5 further shows that the generating unit 5 can be equipped with a selection means 14 which is adapted to select at least one or more of the number of noise generators 11-13 for providing a band-limited noise signal RB for the HF signal HF. For example, the selection means 14 selects the first noise generator 11 so the band-limited noise signal RB corresponds to the first masking signal M1 (see FIGS. 6 and 7, in accordance with which the first masking signal M1 corresponds to the band-limited noise signal RB).

Figure 7:
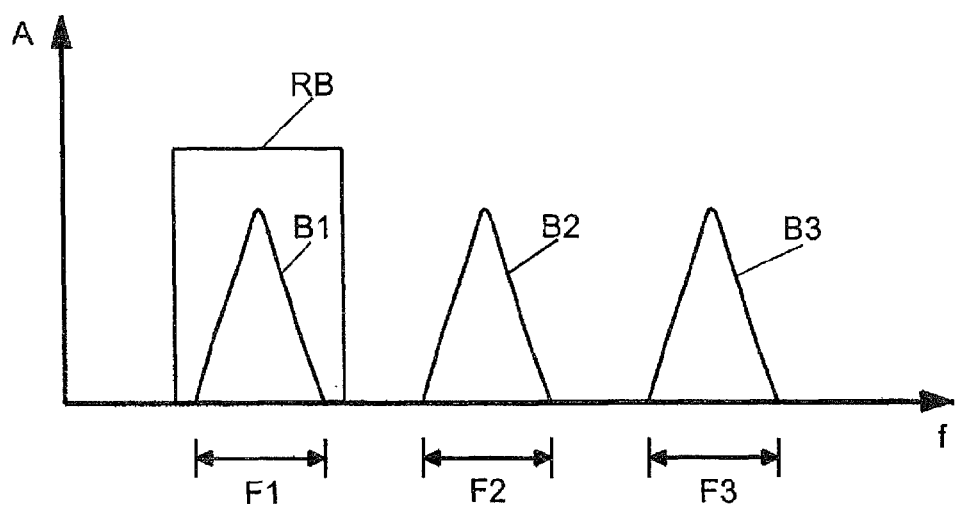
FIG. 7 is a schematic amplitude-frequency diagram of an embodiment with a band-limited noise signal generated in accordance with FIG. 5 and three terrestrial base station signals.

With reference to FIG. 7 the respective frequency band F1-F3 of the band-limited noise signal RB is preferably set to at least a corresponding predetermined frequency band F1-F3 of a respective terrestrial base station signal B1-B3 of a base station.

The trigger means 15 can consequently be set up to carry out a plurality of functional tests in series with differently selected band-limited noise signals RB. In this instance, the evaluation means 8 can be set up to provide a test result vector E as a function of the plurality of functional tests of the communication system carried out in series. Furthermore, the error detection means 18 can be set up to detect an error F of one or more noise generators 11-13 and/or an error F over the transmission path 2 as a function of the test result vector E provided.

Before the functional tests are carried out in series with the different band-limited noise signals RB, the measuring unit 7 is preferably brought into a test mode, i.e. the input loss is suitably switched to be minimal so as to adjust the power level of the HF signal HF to be so low that the radiation of the signals via the leaky line antenna 3 lies below the respective legally prescribed threshold value (for example −36 dBm<1 GHz or −30 dBm>1 GHz), in particular outside the aircraft cabin. The need to request legal approval for use of the test frequencies is consequently eradicated for the user of the test device 1.

FIG. 8 shows a schematic block diagram of a third embodiment of the test device 1 according to the invention. In accordance with the third embodiment according to FIG. 8 the transmission path 2 comprises a transmitting leaky line antenna 3a arranged longitudinally in the aircraft cabin, and a receiving leaky line antenna 3b arranged longitudinally in the aircraft cabin.

The transmitting leaky line antenna 3a and the receiving leaky line antenna 3b are preferably arranged in parallel in the aircraft cabin and are each coupled between the first end E1 and the second end E2 of the transmission path 2.

Furthermore, the test device 10 preferably has a plurality of measuring units 7a, 7b. For example, a first measuring unit 7a is coupled at the second end E2 of the transmission path 2 to the transmitting leaky line antenna 3a, and a second measuring unit 7b is coupled at the first end E1 of the transmission path 2 to the receiving leaky line antenna 3b.

The respective measuring unit 7a, 7b measures the power level of the HF signal HF at the respective coupling point K and provides, as a function thereof, a measuring signal MS1. MS2 which is proportional to the respective power level measured. A first setpoint signal SS1, which is dependent on the power level of the fed HF signal HF, for the first measuring signal MS1 and a second setpoint signal SS2 for the second measuring signal MS2 are consequently provided to the evaluation means 8.

Furthermore, at least one transmitting/receiving unit 16a-16c is provided. The respective transmitting/receiving unit 16a-16c is set up to provide a service signal D1-D3 for provision of a predetermined service, such as GSM, UMTS, WLAN and the like, and for transmission via the transmission path 2.

Figure 9:
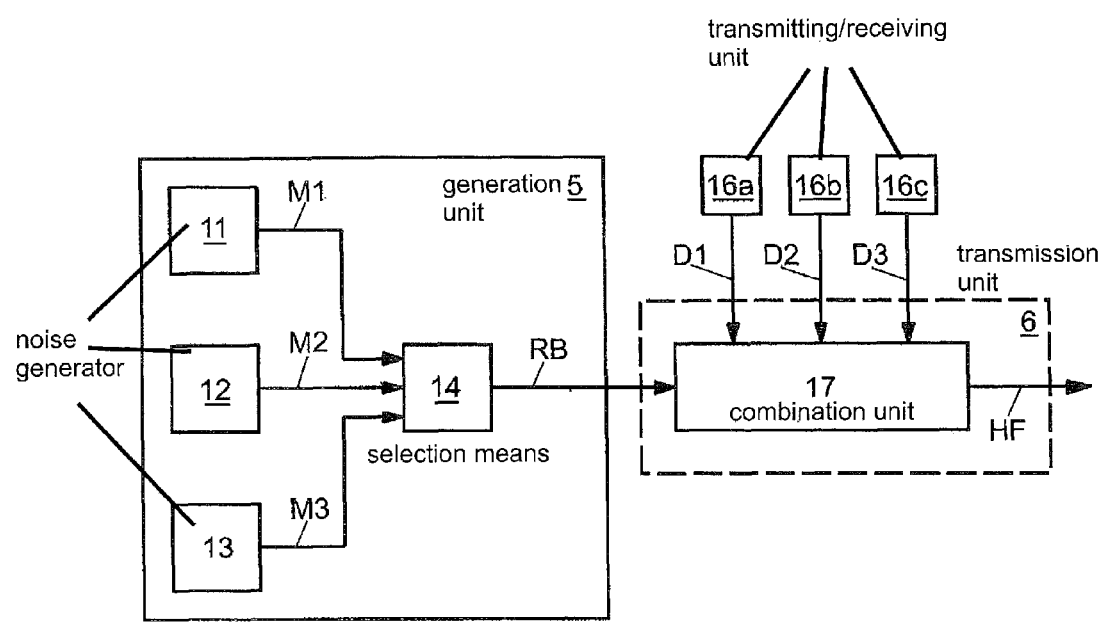
FIG. 9 is a schematic block diagram of an embodiment of a generating unit and a transmission unit according to FIG. 1.

In order to combine the different service signals D1-D3 for the individual services and the noise signal R or the band-limited noise signal RB, the transmission unit 6 preferably comprises a combination unit. The combination unit 17 is described in detail with reference to FIG. 9. FIG. 9 shows a schematic block diagram of an embodiment of a generating unit 5 and a transmission unit 6. The generating unit 5 is constructed in accordance with FIG. 5 and provides a band-limited noise signal RB. The three transmitting-receiving units 16a-16c provide different service signals D1-D3.

The combination unit 17 combines the broadband noise signal RB provided and the at least one service signal D1-D3 as a function of an input (not shown) provided by the user of the test device 1 in order to form the HF signal HF to be fed over the transmission path 2.

Figure 10:
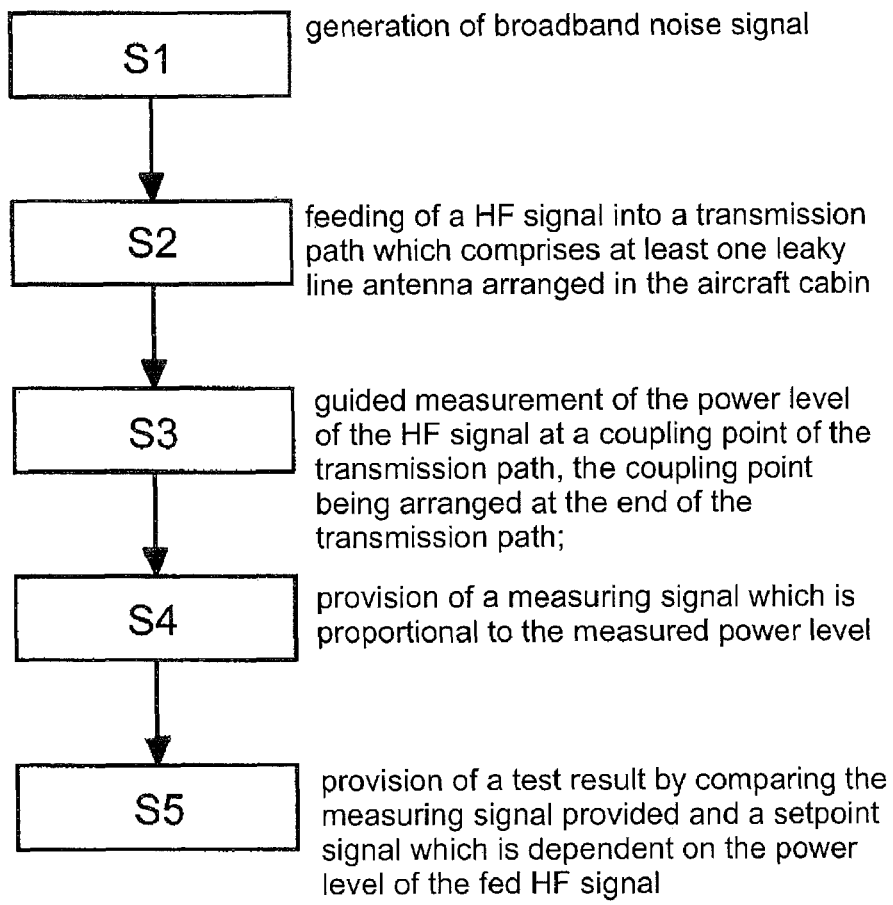
FIG. 10 is a schematic flow diagram of an embodiment of a method for carrying out a functional test of a communication system.

FIG. 10 shows a schematic flow diagram of an embodiment of a method according to the invention for carrying out a functional test of a communication system in an aircraft cabin of an aircraft.

The method according to the invention will be described hereinafter by means of the block diagram in FIG. 10 with reference to the block diagrams in FIGS. 1 to 9. In accordance with FIG. 10, the method according to the invention comprises the following method steps S1 to S5:

Method step S1:
A broadband noise signal R is generated and provided.
Method step S2:
A HF signal HF is fed into a transmission path 2. The transmission path 2 has at least one leaky line antenna 3 arranged in the aircraft cabin. The HF signal HF fed into the leaky line antenna 3 has an adjustable power level and comprises at least the generated broadband noise signal R.
Method step S3:
The power level of the HF signal HF is measured at a predetermined coupling point K of the transmission path 2.
Method step S4:
A measuring signal MS is provided and is proportional to the power level measured.
Method step S5:
A test result E is calculated and provided by comparing the measuring signal MS provided and a setpoint signal SS which is dependent on the power level of the fed HF signal (HF).

Although the present invention has been described herein with reference to preferred embodiments, it is not restricted thereto, but can be modified in many different ways.

LIST OF REFERENCE NUMERALS 1 test device
2 transmission path
3 leaky line antenna
3a transmitting leaky line antenna 3b receiving leaky line antenna
4 control device
5 generating unit
6 transmission unit
7, 7a, 7b measuring unit
8 evaluation means
9 terminating resistor
11-13 noise generator
14 selection means
15 trigger means
16a-16c transmitting/receiving unit
17 combination unit
18 error detection means
19a-19e line
20 load
A power level
D1-D3 service signal
E test result, test result vector
F error
F1-F3 frequency band
HF HF signal
I power
MS, MS1, MS2 measuring signal
R noise signal
RB band-limited noise signal
SS1, SS2, SS3 setpoint signal
S1-S5 method step
TS trigger signal

The invention claimed is:

1. A test device for carrying out a functional test of a communication system, in particular in an aircraft cabin of an aircraft, wherein said test device comprises:
a transmission path which comprises at least one leaky line antenna arranged in the aircraft cabin;
a control device which is coupled to the transmission path and comprises a generating unit for generating a broadband noise signal and a transmission unit for feeding a High Frequency (HF) signal to the leaky line antenna, the fed HF signal having a predetermined power level and containing at least the generated broadband noise signal;
at least one measuring unit which is coupled to the transmission path at a predetermined coupling point at the end of the transmission path for measurement of the power level of the HF signal at the coupling point and for providing a measuring signal which is proportional to the measured power level; and
an evaluation means providing a test result by comparing the measuring signal provided and a setpoint signal which is dependent on the power level of the fed HF signal;
wherein, in a test mode of the measuring unit in which the input loss is switched to be minimal, the power level of the HF signal can be set to be so low that the radiation of the signal via the leaky line antenna lies below a predetermined threshold outside the aircraft cabin and services outside the aircraft are not disturbed.

2. The test device according to claim 1, wherein the noise signal provided is broadband compared with a coherence bandwidth of the transmission path.

3. The test device according to claim 2, wherein the broadband noise signal provided contains at least one masking signal, the respective masking signal being adapted to mask a respective terrestrial base station signal which uses a respective predetermined frequency band.

4. The test device according to claim 1, wherein the measuring unit has a HF termination.

5. The test device according to claim 1, wherein the transmission path has a first end and a second end, the leaky line antenna being coupled between the first end and the second end, the control device being coupled to the first end and/or the evaluation means being coupled to the first end or to the second end.

6. The test device according to claim 1, wherein the generating unit comprises a number of noise generators, the respective noise generator being adapted to provide a respective noise signal which is limited to a predetermined frequency band.

7. The test device according to claim 1, wherein the control unit comprises a selection means which is adapted to select at least one of the number of noise generators for providing a band-limited noise signal for the HF signal.

8. The test device according to claim 7, wherein the control device comprises a trigger means which is set up to trigger implementation of the functional test with the selected band-limited noise signal.

9. The test device according to claim 8, wherein the trigger means is set up to carry out a plurality of functional tests in series with different, selected band-limited noise signals.

10. The test device according to claim 1, wherein the measuring device has a HF detector which is adapted to convert the power level of the HF signal at the coupling point into a proportional direct voltage signal.

11. The test device according to claim 1, wherein the transmission path comprises a transmitting leaky line antenna arranged longitudinally in the aircraft cabin, and a receiving leaky line antenna arranged longitudinally in the aircraft cabin.

12. The test device according to claim 5, wherein a plurality of measuring units are provided, a first measuring unit being coupled to the transmitting leaky line antenna at the second end of the transmission path, and a second measuring unit being coupled to the receiving leaky line antenna at the first end of the transmission path.

13. The test device according to claim 1, wherein at least one transmitting/receiving unit is provided, the respective transmitting/receiving unit being adapted to provide a service signal for provision of a predetermined service and for transmission over the transmission path.

14. The test device according to claim 9, wherein the evaluation means is set up to provide a test result vector as a function of the plurality of functional tests of the communication system carried out in series.

15. The test device according to claim 14, wherein an error detection means is provided which is adapted to detect an error of one or more noise generators and/or an error over the transmission path as a function of the test result vector provided.

16. A method for carrying out a functional test of a communication system, in particular in an aircraft cabin of an aircraft, comprising the following steps:
generating a broadband noise signal;
feeding of a High Frequency (HF) signal into a transmission path which comprises at least one leaky line antenna arranged in the aircraft cabin, the fed HF signal having a predetermined power level and containing at least the generated broadband noise signal;
measurement of the power level of the HF signal at a coupling point of the transmission path, the coupling point being arranged at the end of the transmission path;
providing of a measuring signal which is proportional to the measured power level; and providing of a test result by comparing the provided measuring signal and a setpoint signal which is dependent on the power level of the fed HF signal;

wherein, in a test mode, the power level of the HF signal is set to be so low that the radiation of the signals via the leaky line antenna lies below a predetermined threshold outside the aircraft cabin, in such a way that services outside the aircraft are not disturbed.

\* \* \* \* \*